(12) United States Patent
Kim (10) Patent No.: US 8,451,248 B1
(45) Date of Patent: May 28, 2013

(54) DISPLAY DEVICE AND CONTROL METHOD THEREOF

(71) Applicant: LG Electronics Inc., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/679,582

(22) Filed: Nov. 16, 2012

(30) Foreign Application Priority Data

Sep. 28, 2012 (KR) .......................... 10-2012-0108823

(51) Int. Cl.
*G06F 3/041* (2006.01)

(52) U.S. Cl.
USPC ........... 345/173; 345/174; 345/175; 345/176; 345/177; 345/178; 341/27; 463/30; 434/113; 434/114; 715/702

(58) Field of Classification Search
USPC ...................... 345/173–183; 341/27; 434/113, 434/114; 715/702; 455/575.1–575.9; 463/1–69; 178/18.01–18.11, 19.01–19.07
See application file for complete search history.

(56) References Cited

U.S. PATENT DOCUMENTS

| 7,509,588 B2 * | 3/2009 | Van Os et al. ................. 715/835 |
| 7,956,847 B2 * | 6/2011 | Christie ........................ 345/173 |
| 2006/0026535 A1 * | 2/2006 | Hotelling et al. ............. 715/863 |
| 2009/0167509 A1 * | 7/2009 | Fadell et al. ................ 340/407.2 |
| 2009/0167704 A1 * | 7/2009 | Terlizzi et al. ................ 345/173 |
| 2010/0141411 A1 * | 6/2010 | Ahn et al. .................. 340/407.2 |
| 2011/0018695 A1 * | 1/2011 | Bells et al. ................. 340/407.2 |

* cited by examiner

*Primary Examiner* — Lun-Yi Lao
*Assistant Examiner* — Olga Merkoulova
(74) *Attorney, Agent, or Firm* — Birch, Stewart, Kolasch & Birch, LLP

(57) ABSTRACT

Disclosed is a display device that provides a user with tactile feedback using a tactile user interface. The display device includes a touch sensitive display unit to display an object, a tactile feedback unit to generate tactile feedback, and a controller. The controller detects a first touch that is in contact with a region of a first object displayed on the display unit, detects a second touch controlling the first object that is consecutive to the first touch, controls the first object in response to the second touch, generates first tactile feedback according to properties of the first object in response to the second touch, detects a third touch controlling the first object that is consecutive to the second touch, the third touch being detected in a region of a second object displayed on the display unit, and generates the first tactile feedback in response to the third touch.

20 Claims, 7 Drawing Sheets visual user interface tactile user interface

FIG. 1 visual user interface tactile user interface

FIG. 2 visual user interface tactile user interface visual user interface tactile user interface

FIG. 3

FIG. 4 visual user interface     tactile user interface

DISPLAY DEVICE AND CONTROL METHOD THEREOF

This application claims the benefit of Korean Patent Application No. 10-2012-0108823, filed on Sep. 28, 2012, which is hereby incorporated by reference as if fully set forth herein.

BACKGROUND OF THE INVENTION

1. Field of the Invention

The present invention relates to a display device, and more particularly to a display device capable of providing a user with tactile feedback using a tactile user interface and a control method thereof.

2. Discussion of the Related Art

A display device may provide a user with a user interface for control of an electronic appliance. Through use of the display device, the user can control the electronic appliance by visually confirming an operational state of the electronic appliance. A recent display device is capable of receiving a control command of a user by detecting a user touch gesture via a touch sensitive function. This allows the user to control an electronic appliance by directly touching the digital device without using input tools, such as a keyboard, mouse, etc. Such a display device may provide the user with a variety of user interfaces, examples of which may include a visual user interface and a tactile user interface. A conventional tactile user interface usable with the display device functions to generate only constant tactile feedback regardless of a control operation of the user, and thus has difficulty in adaptively responding to the control operation of the user.

SUMMARY OF THE INVENTION

Accordingly, the present invention is directed to a display device and a control method thereof that substantially obviate one or more problems due to limitations and disadvantages of the related art.

An object of the present invention is to provide a display device which provides a tactile user interface capable of adaptively generating tactile feedback in response to a control operation of a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a touch sensitive display unit configured to display an object, a tactile feedback unit configured to generate tactile feedback, and a controller configured to control the other units, wherein the controller is configured to detect a first touch that is in contact with a region of a first object displayed on the display unit, detect a second touch controlling the first object that is consecutive to the first touch, control the first object in response to the second touch, generate first tactile feedback according to properties of the first object in response to the second touch in a controlled state of the first object, detect a third touch controlling the first object that is consecutive to the second touch, wherein the third touch is detected in a region of a second object displayed on the display unit, and generate the first tactile feedback in response to the third touch in a controlled state of the first object.

In accordance with another aspect of the present invention, a method of controlling a touch sensitive display device, includes detecting a first touch of touching a region of a first object displayed on the display unit, detecting a second touch controlling the first object that is consecutive to the first touch, controlling the first object in response to the second touch, generating first tactile feedback according to properties of the first object in response to the second touch in a controlled state of the first object, detecting a third touch controlling the first object that is consecutive to the second touch, wherein the third touch is detected in a region of a second object displayed on the display unit, and generating the first tactile feedback in response to the third touch in a controlled state of the first object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the embodiments of the present invention will be described in detail with reference to illustrations and descriptions of the accompanying drawings, but the present invention is not limited or restricted by these embodiments.

Although the terms used in the following description are selected, as much as possible, from general terms that are widely used at present while taking into consideration the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

In the present invention, a display device may be an electronic appliance that includes a display unit and a tactile feedback unit and provides a user with a visual user interface and a tactile user interface. The display device may include an electronic appliance having a display unit, such as a smart phone, Personal Digital Assistant (PDA), cellular phone, MP3 music player, laptop computer, smart pad, tablet Personal Computer (PC), television, and smart table, for example. The display device according to the present invention may transmit information to the user using the visual user interface and the tactile user interface. The visual user interface may provide the user with visual feedback using the display unit of the display device. The user can visually confirm information provided from the display device, and control the display device. The tactile user interface may provide the user with tactile feedback using the tactile feedback unit of the display device. The user can confirm information provided from the display device via particular parts of the body that can perceive tactile sensation, such as the finger, etc., and control the display device. The visual user interface and the tactile user interface may be separately provided, or may be simultaneously provided.

Figure 1:
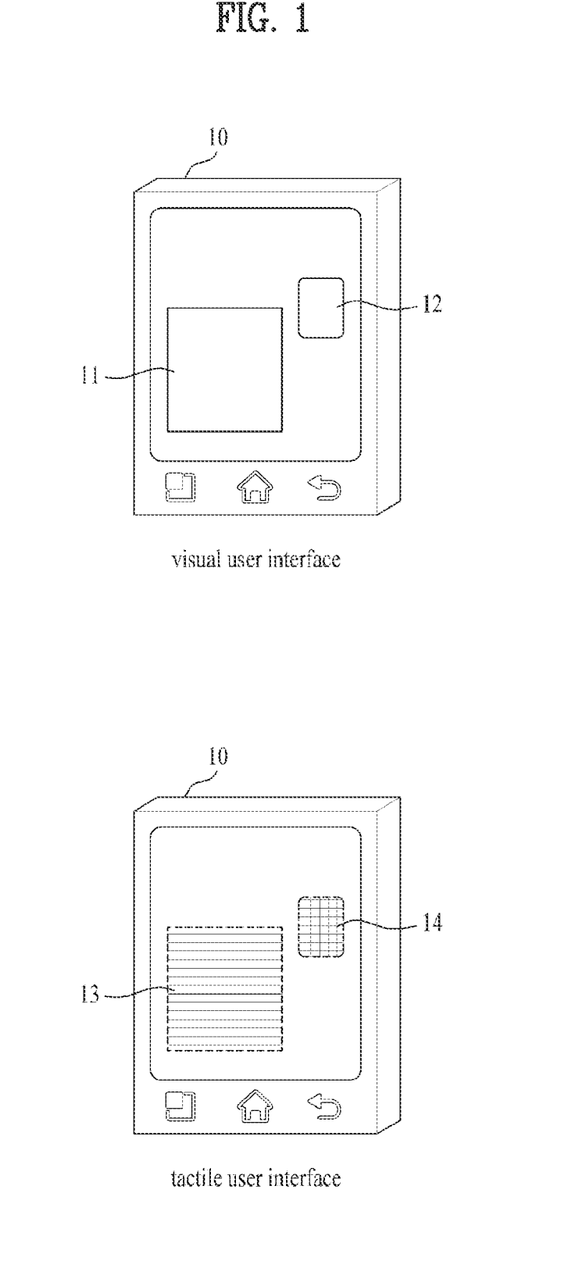
FIG. 1 is a view illustrating a visual user interface and a tactile user interface according to an embodiment of the present invention.

FIG. 1 is a view illustrating a visual user interface and a tactile user interface according to an embodiment of the present invention. A digital device 10 may provide a visual user interface by displaying an object on a touch sensitive display unit. The display device 10 may display a plurality of objects including a first object 11 and a second object 12. The user can visually confirm the displayed objects, and control the corresponding objects by touching the touch sensitive display unit. The display device 10 may provide a tactile user interface, which generates tactile feedback with respect to the visual user interface. The tactile user interface may be generated in a region where the first object 11 and the second object 12 are displayed. The display device 10 may generate first tactile feedback 13 in a region where the first object 11 is displayed according to properties of the first object 11. Likewise, the display device 10 may generate second tactile feedback 14 in a region where the second object 12 is displayed according to properties of the second object 12. Here, properties of the object may include at least one of color, texture, weight, pattern, and brightness of the displayed object. The display device 10 may generate different tactile feedback with respect to respective objects having different properties. For example, in FIG. 1, assuming that the first object 11 and the second object 12 have different textures, the first tactile feedback 13 and the second tactile feedback 14 may be different from each other.

The display device 10 may additionally generate tactile feedback corresponding to friction between the displayed first object 11 and the user's finger. Assuming that a background image is displayed and the first object 11 is displayed on the background image, the display device 10 may generate the first tactile feedback 13 according to properties of the first object 11 and properties of the background image.

The display device 10 may detect pressure of a user touch gesture of touching and pushing the display unit. The display device 10 may control the intensity of tactile feedback in proportion to the pressure of the touch gesture. As such, the user can perceive that the user touches the display unit with how strong pressure. The display device 10 may detect the pressure of the touch gesture using a piezoelectric sensor or based on a detection area of the touch gesture.

Figure 2:
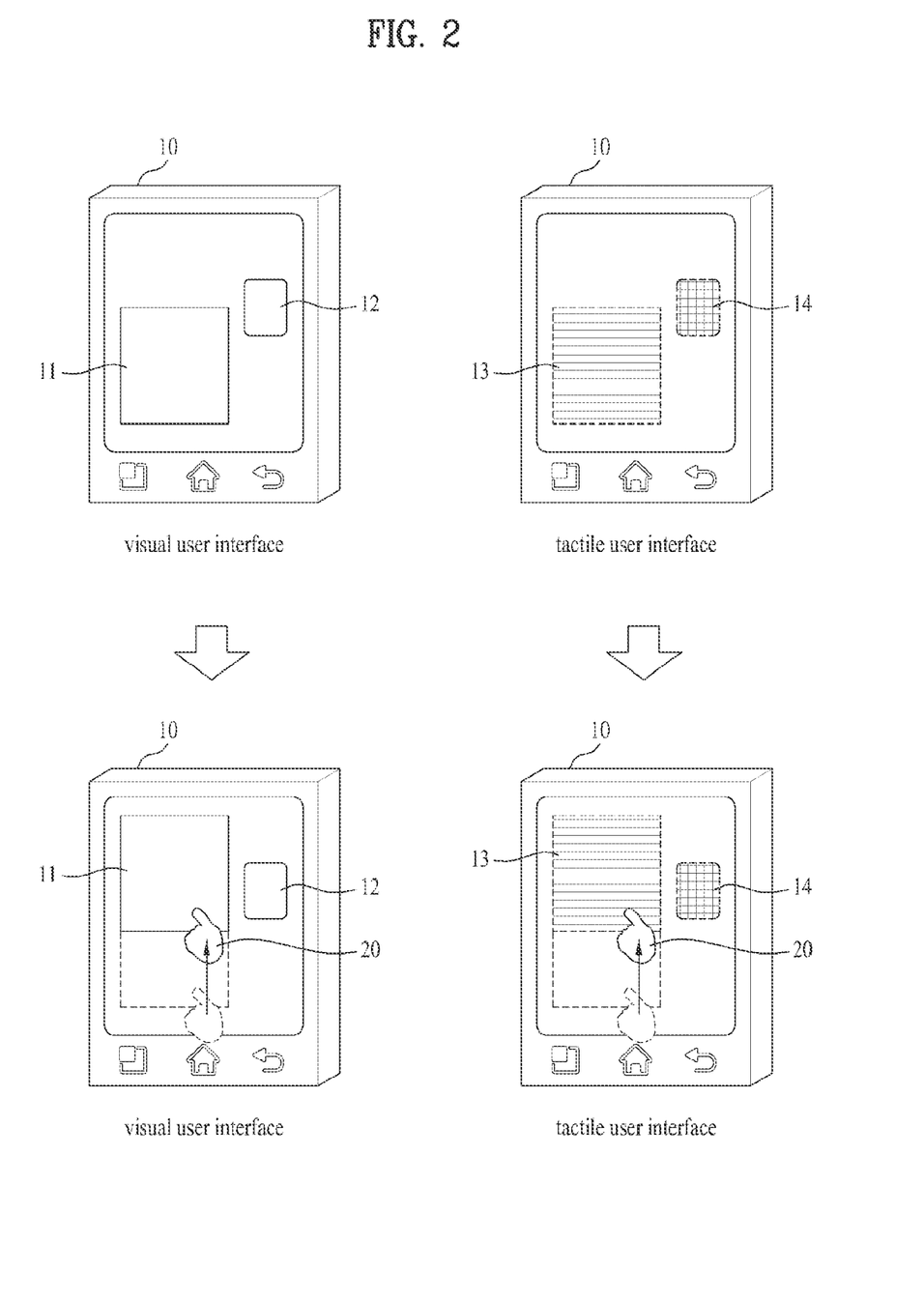
FIG. 2 is a view illustrating movement of a tactile feedback region depending on movement of an object according to an embodiment of the present invention.

FIG. 2 is a view illustrating movement of a tactile feedback region depending on movement of an object according to an embodiment of the present invention. If a displayed object is moved by a user touch gesture, the display device may simultaneously move a tactile feedback region that is generated with respect to the corresponding object according to movement of the object. As illustrated in the upper side of FIG. 2, the display device 10 may display the first object and the second object 12 as visual user interfaces. Additionally, the display device 10 may generate the first tactile feedback 13 with respect to the first object 11 and the second tactile feedback 14 with respect to the second object 12, to provide the user with tactile user interfaces. Each tactile feedback may be generated in a region where the corresponding object is displayed. As illustrated in the lower side of FIG. 2, if the user touches and drags the first object 11 to a position as represented by reference numeral 20, the display device 10 may move the first object 11 so as to display the first object 11 at the position 20. The display device 10 may also move the first tactile feedback 13 with respect to the first object 11 simultaneously with movement of the first object 11. In this case, the first tactile feedback 13 may be generated in a region where the first object 11 is displayed.

The display device 10 may generate the first tactile feedback 13 according to properties of the first object 11. Here, properties of the first object 11, as described above with reference to FIG. 1, may include texture, pattern, and color, for example. In addition to the first tactile feedback 13, the display device 10 may further generate tactile feedback corresponding to friction between the displayed first object 11 and the user's finger. Assuming that a background image is displayed and the first object 11 is controlled on the background image, the display device 10 may further generate tactile feedback according to properties of the first object 11 and properties of the background image, in addition to the first tactile feedback 13.

The second object 12, which is not subjected to the above described touch and drag operation of the user, may be displayed at the same position without movement. Thereby, the second tactile feedback 14 with respect to the second object 12 may be generated in a region where the second object 12 is displayed without movement. In this way, the display device 10 may provide the user with continuous tactile feedback with respect to an object selected by the user even if the user moves the corresponding object.

Figure 3:
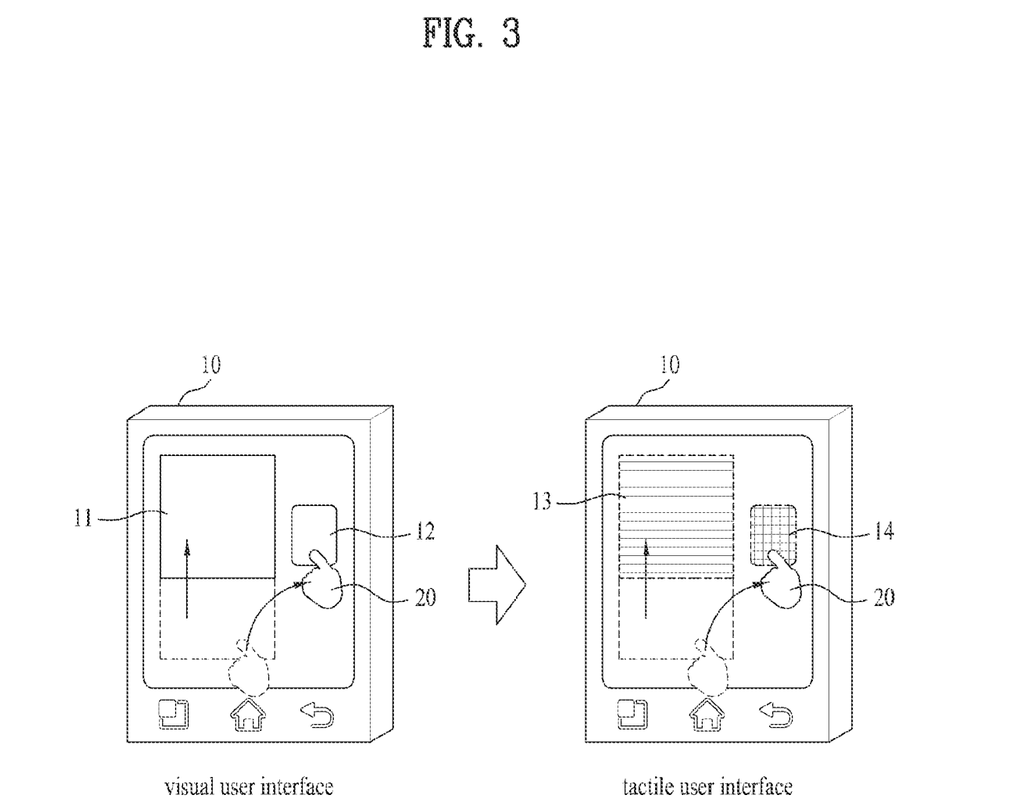
FIG. 3 is a view illustrating a method of locking a movement direction depending on movement of an object according to an embodiment of the present invention.

FIG. 3 is a view illustrating a method of locking a movement direction depending on movement of an object according to an embodiment of the present invention. The display device 10 may lock a particular movement direction of an object when moving the object in response to a user touch gesture. The user touch gesture may be divided into an X-axis component and a Y-axis component on the touch sensitive display unit. When the user touch gesture of moving the object contains a plurality of movement direction components, the display device 10 may move the object by extracting only a main movement direction component of the touch gesture. More specifically, as illustrated in FIG. 3, even if it is detected that a touch gesture 20 of moving the first object 11 has an X-axis movement direction component and a Y-axis movement direction component, the display device 10 may extract only the Y-axis movement direction component of the touch gesture 20. As a result, the display device 10 may move the first object 11 along a Y-axis in a positive direction without X-axis movement.

The display device 10 may perform locking of the particular movement direction in consideration of properties of the object. For example, in the case of a document or web-page that requires upward or downward scrolling, the display device 10 may move the object upward or downward using only the Y-axis movement direction component even if the touch gesture 20 contains the X-axis movement direction component and the Y-axis movement direction component. Likewise, in the case of a document or web-page that requires leftward or rightward scrolling, the display device 10 may move the object leftward or rightward using only the X-axis movement direction component even if the touch gesture 20 contains the X-axis movement direction component and the Y-axis movement direction component.

The display device 10 may generate tactile feedback in response to a user touch gesture of moving the object. The display device 10, as illustrated in the right side of FIG. 3, may generate tactile feedback in response to the user touch gesture 20. When the user touch gesture 20 is detected in a region of the first object 11, the display device 10 may generate the first tactile feedback 13. The display device 10 may move the region in which the first tactile feedback 13 is generated simultaneously with the first object 11 being moved by the touch gesture 20. If the user touch gesture 20 of moving the first object 11 enters a region in which the second object 12 is displayed, the display device 10 may generate the second tactile feedback 14 in the region of the second object 12. If the first object 11 and the second object 12 have different properties, the display device 10 may generate the second tactile feedback 14 different from the first tactile feedback 13 in the region of the second object 12. The user can perceive the second tactile feedback 14 via tactile sensation, and recognize that the user touch gesture 20 deviates from the region of the first object 11 and enters the region of the second object 12. In this way, the display device 10 may indicate that the user touch gesture 20 is shifted from the region of the first object 11 to the region of the second object 12.

According to an embodiment, the above described second object 12 may be a background image displayed on the display unit of the display device 10. Accordingly, even in the case in which the touch gesture 20 of moving the first object 11 deviates from the region in which the first object 11 is displayed, the display device 10 may generate tactile feedback different from the first tactile feedback 13. Even in this case, the user can perceive the tactile feedback different from the first tactile feedback 13, and recognize that the user touch gesture 20 deviates from the region of the first object 11.

Figure 4:
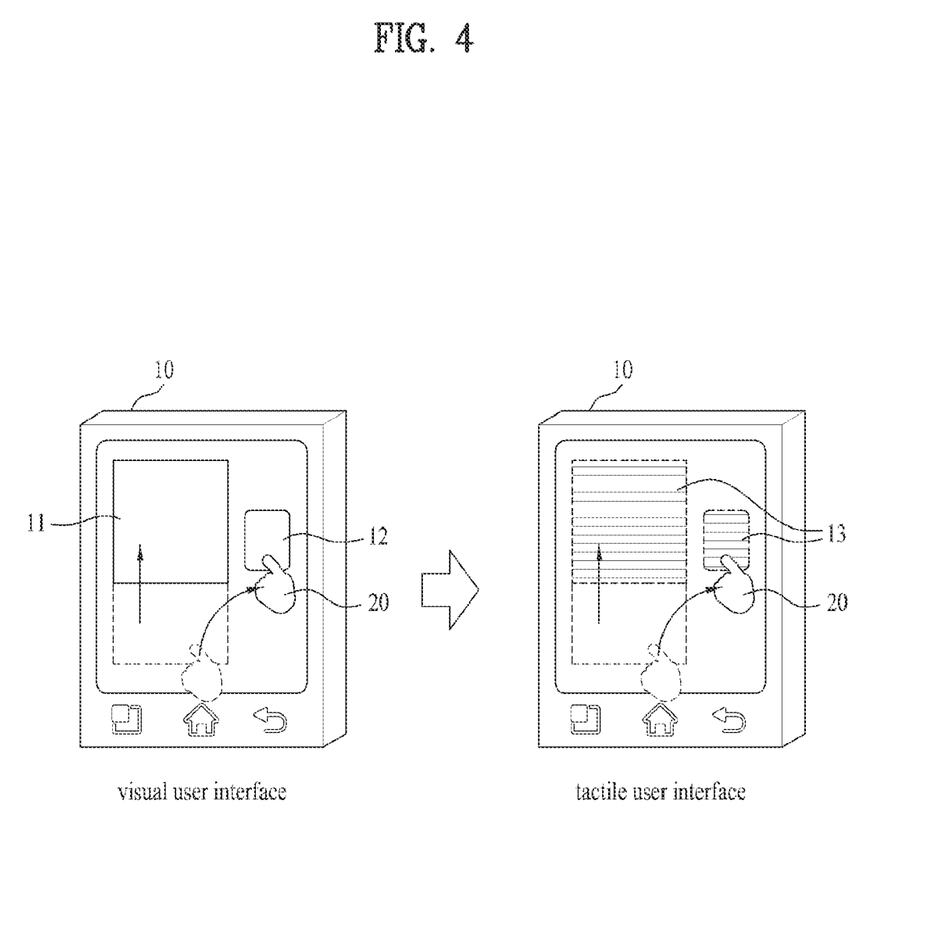
FIG. 4 is a view illustrating a method of locking tactile feedback depending on movement of an object according to an embodiment of the present invention.

FIG. 4 is a view illustrating a method of locking tactile feedback depending on movement of an object according to an embodiment of the present invention. The display device 10 may provide the user with continuous tactile feedback when controlling a displayed object in response to a user touch gesture. Specifically, the display device 10 may generate initial first tactile feedback even if a user touch gesture of touching a first region in which the first tactile feedback is generated enters a second region in which second tactile feedback is generated while maintaining contact with the touch sensitive display unit.

The display device 10, as illustrated in the left side of FIG. 4, may control a displayed object in response to a user touch gesture. Control of an object may include movement, rotation, enlargement and contraction of an object. Also, control of the object may include selection of an object, or call of a subordinate menu with respect to an object. The display device 10 may generate continuous tactile feedback in response to a user touch gesture controlling an object. The display device 10, as illustrated in the right side of FIG. 4, may generate tactile feedback in response to the user touch gesture 20. The display device 10 may generate the first tactile feedback 13 when the user touch gesture 20 is detected in the region of the first object 11.

As the first object 11 is moved by the touch gesture 20, the display device 10 may simultaneously move a region in which the first tactile feedback 13 is generated. The display device 10, as described above with reference to FIG. 3, may move the first object 11 by extracting only a vertical movement component among movement direction components of the touch gesture 20. As such, the user touch gesture 20 may deviate from the region of the first object 11 and enter the region of the second object 12.

If the touch gesture 20 of moving the first object 11 is detected in a region in which the second object 12 is displayed, the display device 10 may lock tactile feedback in response to the touch gesture 20 and generate the first tactile feedback 13 in the region of the second object 12. Even if the first object 11 and the second object 12 have different properties, the display device 10 may generate the first tactile feedback 13 instead of the second tactile feedback in the region of the second object 12. That is, as illustrated in FIG. 2, even if the second tactile feedback 14 is generated in the region of the second object 12, the display device 10 may replace the second tactile feedback 14 by the first tactile feedback 13 when the touch gesture 20 controlling the first object 11 is detected in the region of the second object 12. In this way, while the user touch gesture 20 controls the first object 11, the display device 10 may lock tactile feedback with respect to the user touch gesture 20, so as to generate the first tactile feedback 13 regardless of the region in which the touch gesture 20 is detected.

As described above, the display device 10 may indicate that an object that is under control of the user is still the first object 11 by continuously generating the first tactile feedback 13 regardless of the region in which the touch gesture 20 is detected. The user can visually confirm that the user touch gesture 20 touches the region of the second object 12, and recognize, via tactile sensation, that the user touch gesture 20 controls the first object 11 for generation of the first tactile feedback 13.

In the case in which control of a touch gesture with respect to a first object ends, the display device 10 may unlock tactile feedback that has been locked with respect to the corresponding touch gesture. The display device 10 may detect motion that the user's hand leaves the touch sensitive display unit as the end of the touch gesture controlling the first object. As such, if the user touch gesture controlling the first object ends as the user's hand leaves the region of the second object 12 and thereafter the user's hand again touches the region of the second region 12, the display device 10 may generate second tactile feedback rather than first tactile feedback that has been locked in the corresponding region. Note that the display device 10 may set a time threshold. If the user again touches the region of the second object within the time threshold after the user's hand leaves from the region of the second object, the display device 10 may continuously lock tactile feedback so as to generate the first tactile feedback in the region of the second object.

The display device 10 may also unlock tactile feedback that has been locked in the case in which a distance between a position where a touch gesture is detected and a first object exceeds a preset distance threshold. The display device 10 may unlock tactile feedback that has been locked if the touch gesture controlling the first object is detected in a region exceeding the distance threshold from the first object. Additionally, even in the case in which the user moves the user's finger that is touching the first object to a position spaced apart from the first object by more than the distance threshold while maintaining contact with the display unit, the display device 10 may unlock the tactile feedback that has been locked. Once the tactile feedback has been unlocked, the display device 10 may generate tactile feedback according to properties of the object displayed in the region in which the touch gesture is detected.

According to an embodiment, the above described second object may be a background image displayed on the display unit of the display device 10. Accordingly, the display device 10 may generate the first tactile feedback even in the case in which the touch gesture of moving the first object deviates from the region in which the first object is displayed. Even in this case, the user may continuously perceive the first tactile feedback and recognize that the user touch gesture continuously controls the first object although the touch gesture deviates from the region of the first object.

The display device 10, as described above, may lock tactile feedback between a plurality of objects or between an object and a background image. The embodiment of the present invention may be applied even in the case in which a plurality of feedback is generated within a single object. For example, a first region and a second region for generating first tactile feedback and second tactile feedback respectively may be present within a first object. As described above, in the case in which a touch gesture of touching the first region enters the second region while controlling the first region, the display device 10 may lock tactile feedback in response to the corresponding touch gesture so as to continuously generate the first tactile feedback. In this way, the display device 10 may generate the first tactile feedback in the second region in response to the touch gesture.

Figure 5:
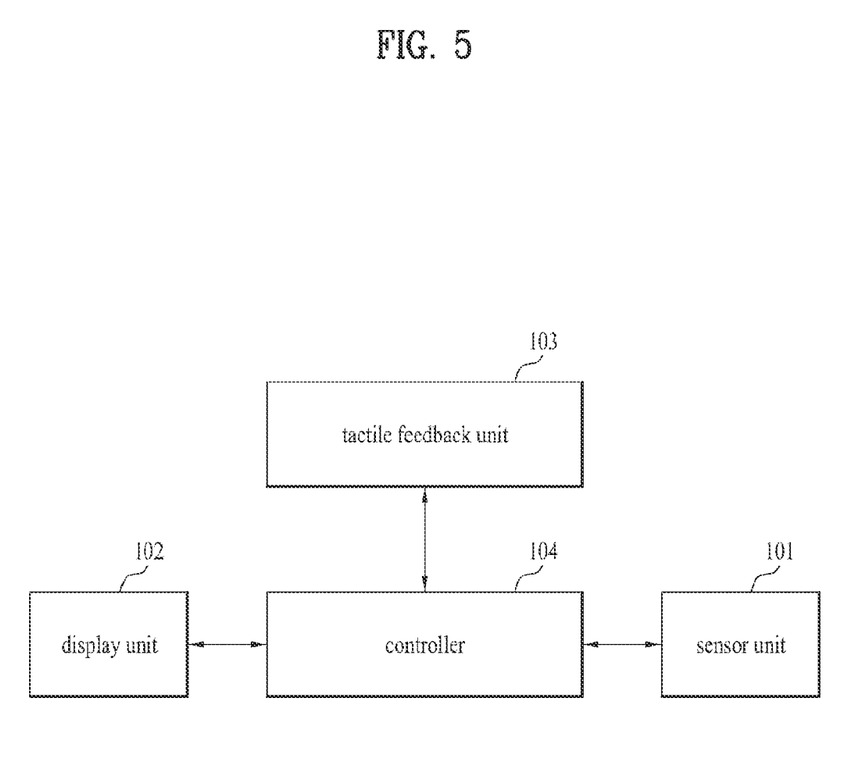
FIG. 5 is a block diagram illustrating a display device according to an embodiment of the present invention.

FIG. 5 is a block diagram illustrating a display device according to an embodiment of the present invention. In FIG. 5, the display device may include a sensor unit 101, a display unit 102, a tactile feedback unit 103, and a controller 104.

The sensor unit 101 may transmit a user input or an environment recognized by the display device to the controller 104 using a plurality of sensors equipped in the display device. The sensor unit 101 may include a plurality of sensing means. In an embodiment, the plurality of sensing means may include a piezoelectric sensor, a video sensor, and a touch sensor, for example. In the present invention, the piezoelectric sensor and the touch sensor may detect a user tough gesture. The display device may determine a position on the display unit where the touch gesture is detected using the sensor unit 101. The display device may provide tactile feedback at a position or region in which the touch gesture is detected. The sensor unit 101 is a generic term of the aforementioned various sensing means, and may detect touch gestures having various properties and transmit the sensed results to the controller 104, so as to allow the display device to perform a corresponding operation. The aforementioned sensors may be embodied into separate elements included in the display device, or may be combined to constitute at least one element included in the display device.

The display unit 102 may output an image on a display screen. The display unit 102 may serve as the above described touch sensor under the assumption that the display unit 102 is of a touch sensitive display type. Accordingly, the display unit 102 may detect a touch gesture thereto, and transmit the touch gesture to the controller 104. The display unit 102 may serve to display a visual user interface on a display panel, or to control display of an image. In the present invention, the display unit 102 may display a visual user interface, and detect a user touch gesture. Also, the display unit 102 may provide the user with tactile feedback in conjunction with the tactile feedback unit 103 that will be described hereinafter. The display unit 102 may include a flexible display.

The tactile feedback unit 103 may provide a tactile user interface. The tactile feedback unit 103 may provide a tactile user interface corresponding to the visual user interface provided by the display unit 102. The tactile feedback unit 103 may generate different tactile feedback according to properties of a displayed object. The properties of the object may include at least one of color, texture, weight, pattern and brightness.

A method of providing the user with the tactile user interface using the tactile feedback unit 103 is as follows. Tactile feedback may be provided with respect to the user's finger or a stylus that touches the display unit 102 using a minutely vibrating actuator. The tactile feedback unit 103 may adjust the frequency and magnitude of vibration, thereby adjusting friction between the user's finger and the display unit 102. Additionally, the tactile feedback unit 103 may provide the user with tactile feedback by applying a fine current to the display unit 102. The tactile feedback unit 103 may adjust the strength and generation period of current, which may provide the user with different tactile sensations. The tactile feedback unit 103 may provide tactile feedback using ultrasonic resonance. The tactile feedback unit 103 may provide the user with tactile feedback by generating ultrasonic wave plural times and causing resonation of the ultrasonic waves within a specific range. The tactile feedback unit 103 may provide different tactile feedback by adjusting the magnitude of resonance frequency and the resonance generation period of the frequency.

The controller 104 may control the above described units of the display device 10, and manage data transmission/reception between the units. In the present invention, the controller 104 may determine whether or not to lock tactile feedback in response to a touch gesture based on positions where an object to be controlled by a user touch gesture and the touch gesture are detected, or based on continuity of the touch gesture. For example, the controller 104 may provide first tactile feedback in response to a touch gesture that is detected in the region in which a first object is displayed. The first tactile feedback may be generated according to properties of the first object. If the touch gesture is dragging the first object to a region where a second object or a background image is displayed while controlling the first object, the controller 104 may lock the tactile feedback in response to the corresponding touch gesture. That is, even if the first object is detected at the outside of a region in which the first object is initially displayed while the touch gesture controls the first object, the controller 104 may generate the first tactile feedback in a region in which the touch gesture is detected. The controller 104 may continuously lock the tactile feedback while the user's finger comes into contact with the display unit via the touch gesture. The controller 104 may unlock the tactile feedback with respect to the touch gesture if contact between the touch gesture and the display unit ends. In other words, unlocking of the tactile feedback may be permitted only when the user's hand leaves the touch sensitive display unit 102.

In the present invention, the controller 104 may activate the touch sensitive display unit 102 to detect a user touch gesture. In this case, the touch sensitive display unit 102 may do not provide a visual user interface, but provide a tactile user interface. Additionally, to detect the user touch gesture, the controller 104 may activate a touch sensor, a piezoelectric sensor, or a pressure sensor of the sensor unit 101 instead of the touch sensitive display unit 102.

FIG. 5 is a block diagram according to the embodiment of the present invention, and separately displayed blocks represent logically distinguished elements of the device. Accordingly, the elements of the above described device may be mounted in a single chip or in a plurality of chips according to a device design.

Figure 6:
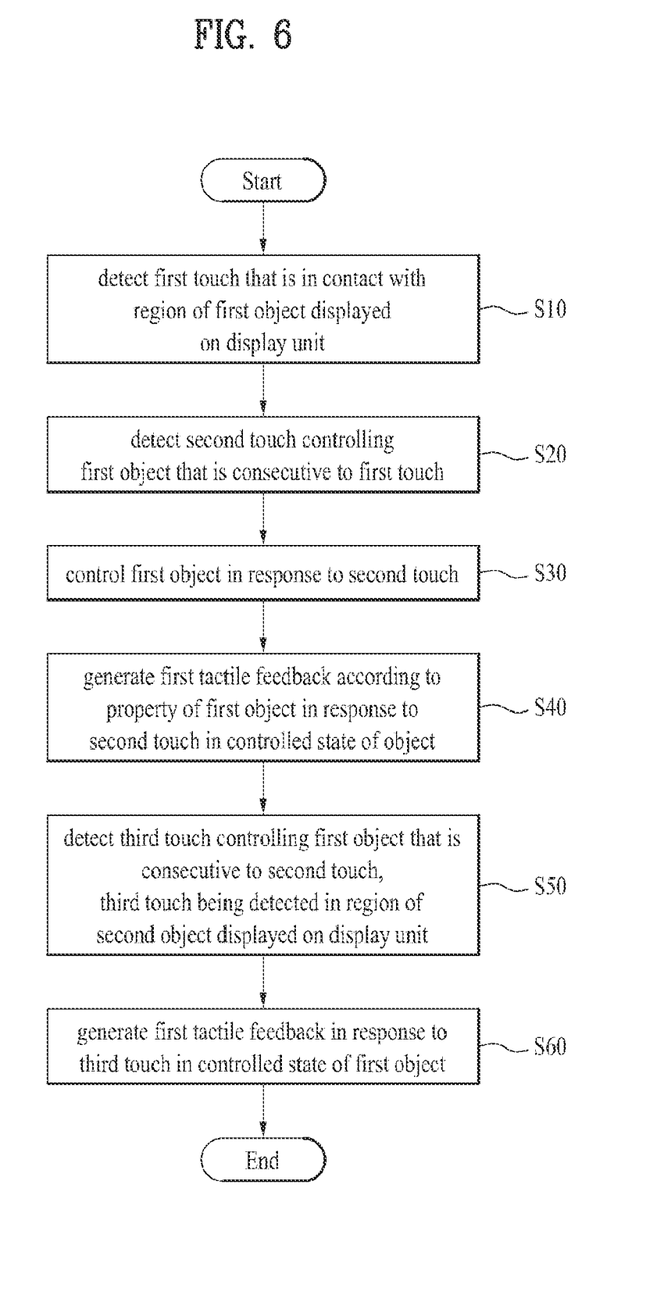
FIG. 6 is a view illustrating a method of providing continuous tactile feedback in response to a touch gesture controlling an object according to an embodiment of the present invention.

FIG. 6 is a view illustrating a method of providing continuous tactile feedback in response to a touch gesture to control an object according to an embodiment of the present invention.

The display device may detect a first touch of touching a region of a first object displayed on the display unit (S10). The first object may be displayed on the display unit to assist the user in visually confirming the first object. The user may touch the region in which the first object is displayed, in order to control the first object.

The display device may detect a second touch controlling the first object that is consecutive to the first touch (S20). The second touch may be a consecutive touch gesture of the first touch. Here, the consecutive touch gesture, as described above with reference to FIG. 4, may indicate a touch gesture that is input while contact between the user's finger and the display unit is maintained, or a touch gesture detected within a preset time threshold after a previous touch gesture ends even if contact between the user's finger and the display unit is not maintained. The display device may detect the second touch controlling the first object. The second touch may control the first object to move or rotate the first object. Additionally, the second touch may include motion to enlarge or contract the first object.

The display device may control the first object in response to the second touch (S30). The display device may control the first object in response to the detected second touch. The first object may be moved or rotated on the display unit by the second touch. Additionally, the first object may be enlarged or contracted by the second touch.

The display device may generate first tactile feedback according to properties of the first object in response to the second touch in a controlled state of the object (S40). The display device may generate the first tactile feedback according to properties of the first object using the tactile feedback unit. The tactile feedback unit, as described above with reference to FIG. 5, may generate the first tactile feedback in response to the second touch using ultrasonic vibration, fine current or ultrasonic resonance. The user may recognize that the first object is under control of the user by perceiving the first tactile feedback. That is, the display device may display that the first object is under control using the display unit, and may generate the first tactile feedback representing that the first object is under control using the tactile feedback unit. The display device may generate the first tactile feedback according to properties of the first object. The display device may generate the first tactile feedback in consideration of at least one of texture, pattern, shape, size, intensity and brightness of the displayed first object.

The display device may generate additional tactile feedback according to properties of a background image. The display device may generate the additional tactile feedback in consideration of properties of the background image and the first object together. For example, the display device may generate not only first tactile feedback tactile feedback, but also additional tactile feedback corresponding to friction in consideration of textures of the background image and the first object.

The display device may generate additional tactile feedback corresponding to friction between the first object and the user's finger. The display device may determine the magnitude of friction between the first object and the user's finger according to texture of the first object, and generate additional tactile feedback in addition to the first tactile feedback.

The display device may detect a third touch controlling the first object that is consecutive to the second touch (S50). In this case, the third touch may be detected in a region of a second object displayed on the display unit. The user touch gesture, as described above with reference to FIG. 4, may deviate from the region in which the first object is displayed and enter the region in which the second object is displayed while continuously controlling the first object. If the touch gesture controlling the first object is detected in the region in which the second object is displayed, the display device may recognize the touch gesture as a third touch. As described above with reference to FIG. 4, the third touch may be a touch gesture that is input that is consecutive to the second touch in a state in which contact between the user's finger and the display unit is maintained. The third touch may indicate a touch gesture detected within a preset time threshold after the second touch ends although the user's finger does not continuously touch the display unit.

The display device may generate the first tactile feedback in response to the third touch in a controlled state of the object (S60). The display device, as described above with reference to FIG. 4, may lock tactile feedback while an object is controlled. Accordingly, the display device may generate the first tactile feedback in response to the third touch controlling the first object. The display device may generate the first tactile feedback regardless of a region or position where the third touch is detected while the first object is controlled by the third touch. In an alternative embodiment, the display device may generate the first tactile feedback until contact between the user's finger and the display unit by the third touch is released.

The display device may unlock the first tactile feedback that has been locked if control of the first object by the third touch ends. In an alternative embodiment, the display device may unlock the tactile feedback that has been locked until contact between the user's finger and the display unit by the third touch is released. The display device may unlock the tactile feedback that has been locked even when the third touch is detected at a position exceeding a preset distance threshold from the first object. Once the tactile feedback has been unlocked, the display device may generate tactile feedback according to properties of an object or a background image displayed in the region in which the user touch gesture is detected.

Figure 7:
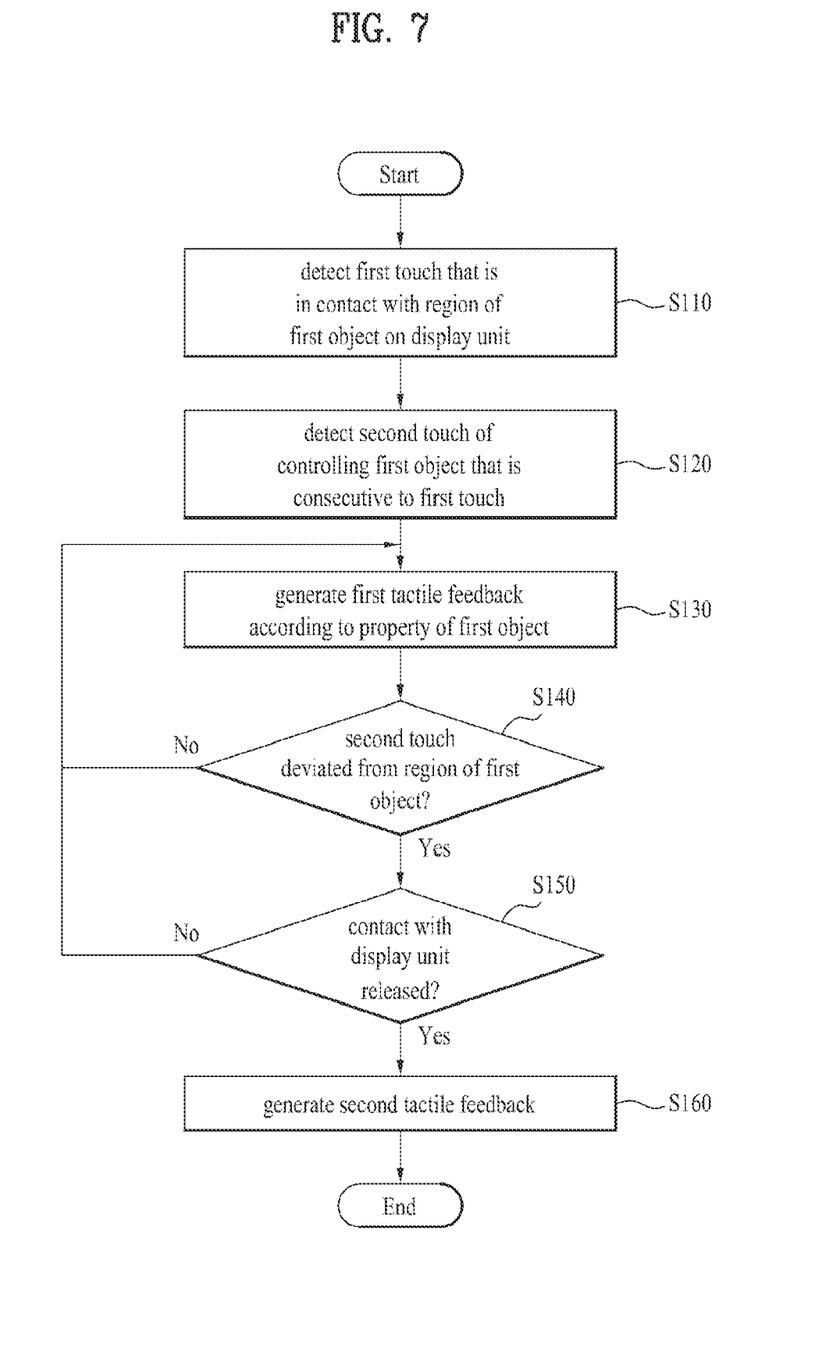
FIG. 7 is a view illustrating a method of providing continuous tactile feedback in response to a touch gesture controlling an object according to another embodiment of the present invention.

FIG. 7 is a view illustrating a method of providing continuous tactile feedback in response to a touch gesture to control an object according to another embodiment of the present invention.

The display device may detect a first touch of touching a region of a first object displayed on the display unit (S110). The first object may be displayed on the display unit to assist the user in visually confirming the first object. The user may touch the region in which the first object is displayed, in order to control the first object.

The display device may detect a second touch controlling the first object that is consecutive to the first touch, and control the first object in response to the first touch (S120). The second touch may be a consecutive touch gesture of the first touch. Here, the consecutive touch gesture, as described above with reference to FIG. 4, may indicate a touch gesture that is input while contact between the user's finger and the display unit is maintained, or a touch gesture detected within a preset time threshold after a previous touch gesture ends even if contact between the user's finger and display unit is not maintained. The display device may detect a second touch controlling the first object. The second touch may control the first object to move or rotate the first object. Additionally, the second touch may include motion to enlarge or contract the first object.

The display device may control the first object in response to the detected second touch. The first object may be moved or rotated on the display unit by the second touch. Additionally, the first object may be enlarged or contracted by the second touch.

The display device may generate first tactile feedback according to properties of the first object in response to the second touch in a controlled state of the object (S130). The display device may generate the first tactile feedback according to properties of the first object using the tactile feedback unit. The tactile feedback unit, as described above with reference to FIG. 5, may generate the first tactile feedback in response to the second touch using ultrasonic vibration, fine current or ultrasonic resonance. The user may recognize that the first object is under control of the user by perceiving the first tactile feedback. That is, the display device may display that the first object is under control using the display unit, and may generate the first tactile feedback representing that the first object is under control using the tactile feedback unit. The display device may generate the first tactile feedback according to properties of the first object. The display device may generate the first tactile feedback in consideration of at least one of texture, pattern, shape, size, intensity and brightness of the displayed first object.

The display device may generate additional tactile feedback according to properties of a background image. The display device may generate the additional tactile feedback in consideration of properties of the background image and the first object. For example, in addition to the first tactile feedback, the display device may generate tactile feedback corresponding to friction in consideration of textures of the background image and the first object.

The display device may generate additional tactile feedback corresponding to friction between the first object and the user's finger. The display device may determine the magnitude of friction between the first object and the user's finger according to texture of the first object to generate the tactile feedback in addition to the first tactile feedback.

The display device may judge whether or not the second touch deviates from the region of the first object (S140). The user touch gesture, as described above with reference to FIG. 4, may deviate from the region in which the first object is displayed while controlling the first object. The display device may generate the first tactile feedback if the second touch does not deviate from the region of the first object.

The display device may judge whether or not contact between the second touch and the display unit is released if the second touch deviates from the region of the first object (S150). The display device, as described above with reference to FIG. 4, may lock the first tactile feedback in response to the second touch while contact between the second touch and the display unit is maintained. The display device may generate the first tactile feedback regardless of the region in which the second touch is detected if contact between the second touch and the display unit is not released.

The display device may generate second tactile feedback if contact between the second touch and the display unit is released (S160). As described above with reference to FIG. 5, the second tactile feedback may be different from the first tactile feedback. The display device may generate the second tactile feedback according to properties of an object or a background image located in a region where the second touch is detected. The display device may generate the second tactile feedback in consideration of at least one of texture, pattern, shape, size, intensity and brightness of the object or the background image in the region in which the displayed second touch is detected.

As described above, the display device may provide continuous tactile feedback in response to a user touch gesture, thereby achieving inconsistent provision of an object to be controlled by the user and tactile feedback.

As is apparent from the above description, a display device according to the present invention may adaptively generate tactile feedback according to a control operation of the user.

Further, according to the present invention, the display device may provide preset tactile feedback changed on a per region basis.

Furthermore, according to the present invention, the display device may provide continuous tactile feedback in response to a user touch gesture.

In addition, according to the present invention, the display device may lock tactile feedback in response to the user touch gesture so as to provide constant tactile feedback while the user controls an object.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display device comprising:
    a touch sensitive display unit configured to display an object;
    a tactile feedback unit configured to generate tactile feedback; and
    a controller configured to:
    detect a first touch that is in contact with a region of a first object displayed on the display unit;
    detect a second touch controlling the first object that is consecutive to the first touch;
    control the first object in response to the second touch;
    generate first tactile feedback according to properties of the first object in response to the second touch in a controlled state of the first object;
    detect a third touch controlling the first object that is consecutive to the second touch, wherein the third touch is detected in a region of a second object displayed on the display unit; and
    generate the first tactile feedback in response to the third touch in a controlled state of the first object.

2. The display device according to claim 1, wherein the controller is configured to:
    detect a fourth touch that is input in the region of the second object after contact with the display unit is released; and
    generate second tactile feedback according to properties of the second object in response to a fourth touch.

3. The display device according to claim 1, wherein the controller is configured to generate second tactile feedback according to properties of the second object in response to the third touch if control with respect to the first object by the third touch ends.

4. The display device according to claim 1, wherein the second object is a background image displayed on the display unit.

5. The display device according to claim 1, wherein generation of the first tactile feedback includes additionally generating third tactile feedback corresponding to friction between the first object and user's finger.

6. The display device according to claim 1,
wherein the controller is configured to display a background image, and
wherein generation of the first tactile feedback includes generating the first tactile feedback according to texture of the first object and texture of the background image.

7. The display device according to claim 1, wherein the controller is configured to temporarily generate second tactile feedback different from the first tactile feedback at a time point when the third touch begins to be detected in the region of the second object.

8. The display device according to claim 1, wherein the controller is configured to generate second tactile feedback according to properties of the second object in response to the third touch if a distance between a position where the first object is displayed and a position where the third touch is detected exceeds a preset distance threshold.

9. The display device according to claim 1, wherein the controller is configured to:
detect a fourth touch that is input in the region of the second object after contact with the display unit is released;
generate the first tactile feedback if a time from a time point when contact is released to a time point when the fourth touch is detected is equal to or less than a preset time threshold; and
generate second tactile feedback according to properties of the second object if the time from the time point when contact is released to the time point when the fourth touch is detected exceeds the preset time threshold.

10. The display device according to claim 1, wherein the properties of the first object include at least one of texture, color, weight, pattern and brightness of the displayed first object.

11. The display device according to claim 1, wherein the touch sensitive display unit includes:
a sensor unit configured to detect a user touch gesture; and
a display unit configured to display a visual user interface.

12. The display device according to claim 1, wherein the first touch, the second touch and the third touch are consecutively input while contact between the user's finger and the display unit is maintained.

13. The display device according to claim 1, wherein the controller is configured to control the first object in response to the second touch such that the first object is controlled based on any one of an X-axis component or a Y-axis component of the second touch.

14. The display device according to claim 1, wherein control with respect to the first object includes at least one of movement, rotation, enlargement and contraction of the first object.

15. The display device according to claim 1, wherein the controller is configured to:
detect pressure of a user touch gesture of pushing the display unit; and
control intensity of tactile feedback in proportion to the pressure.

16. The display device according to claim 15, wherein the controller is configured to detect pressure of the touch gesture based on a detected area of the touch gesture.

17. The display device according to claim 1, wherein the display device includes at least one of a smart phone, Personal Digital Assistant (PDA), cellular phone, MP3 music player, laptop computer, smart pad, tablet Personal Computer (PC), television, and smart table, which includes the display unit.

18. The display device according to claim 1, wherein the tactile feedback unit is configured to generate tactile feedback using ultrasonic vibration and to control intensity of the tactile feedback by changing the frequency and magnitude of the ultrasonic vibration.

19. The display device according to claim 1, wherein the tactile feedback unit is configured to provide tactile feedback by applying fine current to the display unit, and to control the tactile feedback by adjusting strength and generation period of fine current.

20. A method of controlling a touch sensitive display device, the method comprising:
detecting a first touch that is in contact with a region of a first object displayed on the display unit;
detecting a second touch controlling the first object that is consecutive to the first touch;
controlling the first object in response to the second touch;
generating first tactile feedback according to properties of the first object in response to the second touch in a controlled state of the first object;
detecting a third touch controlling the first object that is consecutive to the second touch, wherein the third touch is detected in a region of a second object displayed on the display unit; and
generating the first tactile feedback in response to the third touch in a controlled state of the first object.

* * * * *